United States Patent
Ogata

(10) Patent No.: US 7,290,276 B2
(45) Date of Patent: *Oct. 30, 2007

(54) INFORMATION PROCESSING APPARATUS FOR SECURE INFORMATION RECOVERY

(75) Inventor: Eiji Ogata, Fujiawa (JP)

(73) Assignee: Lenovo Singapore Pte. Ltd., Singapore (SG)

( * ) Notice: Subject to any disclaimer, the term of this patent is extended or adjusted under 35 U.S.C. 154(b) by 719 days.

This patent is subject to a terminal disclaimer.

(21) Appl. No.: 10/735,993

(22) Filed: Dec. 15, 2003

(65) Prior Publication Data

US 2004/0172545 A1   Sep. 2, 2004

(30) Foreign Application Priority Data

Feb. 6, 2003   (JP)   ............................. 2003-029813

(51) Int. Cl.
*G06F 17/30*   (2006.01)
(52) U.S. Cl. .................. 726/2; 726/16; 726/27
(58) Field of Classification Search ................ 726/1–2, 726/21, 27–30, 16; 713/1.2
See application file for complete search history.

(56) References Cited

U.S. PATENT DOCUMENTS 6,038,320 A * 3/2000 Miller .......................... 380/44
6,351,782 B1 * 2/2002 Eaves .......................... 710/72

FOREIGN PATENT DOCUMENTS

| JP | 07-121448 | 5/1995 |
| JP | 2000-137557 | 5/2000 |
| JP | 2000-214944 | 8/2000 |
| JP | 2001-099466 | 4/2001 |
| JP | 2001-249784 | 9/2001 |
| JP | 2002-185631 | 6/2002 |
| JP | 2002-236629 | 8/2002 |
| JP | 2002-361982 | 12/2002 |
| JP | 2003-131915 | 5/2003 |

* cited by examiner

*Primary Examiner*—Hosuk Song
(74) *Attorney, Agent, or Firm*—Dillon S Yudell LLP; Carlos Illunoz-Bustam

(57) ABSTRACT

In an information processing apparatus for performing user certification when an OS starts based on security key information of security hardware, a need has arisen to restore the security key information before replacement of the security hardware replaced for troubleshooting. A cancellation means is generated in a second system status generated by a functionally restricted second type OS start such as a safe mode. Although the user certification based on the security key information of the security hardware is usually performed in a first type OS start, the cancellation means cancels it. Thus, it is possible to put the information processing apparatus in a first system status without undergoing the user certification so as to restore the security key information. A cancel release means releases cancellation of the user certification so that the user certification on the first type OS start is restored after the restoration of the security key information.

6 Claims, 9 Drawing Sheets

[Figure 1]
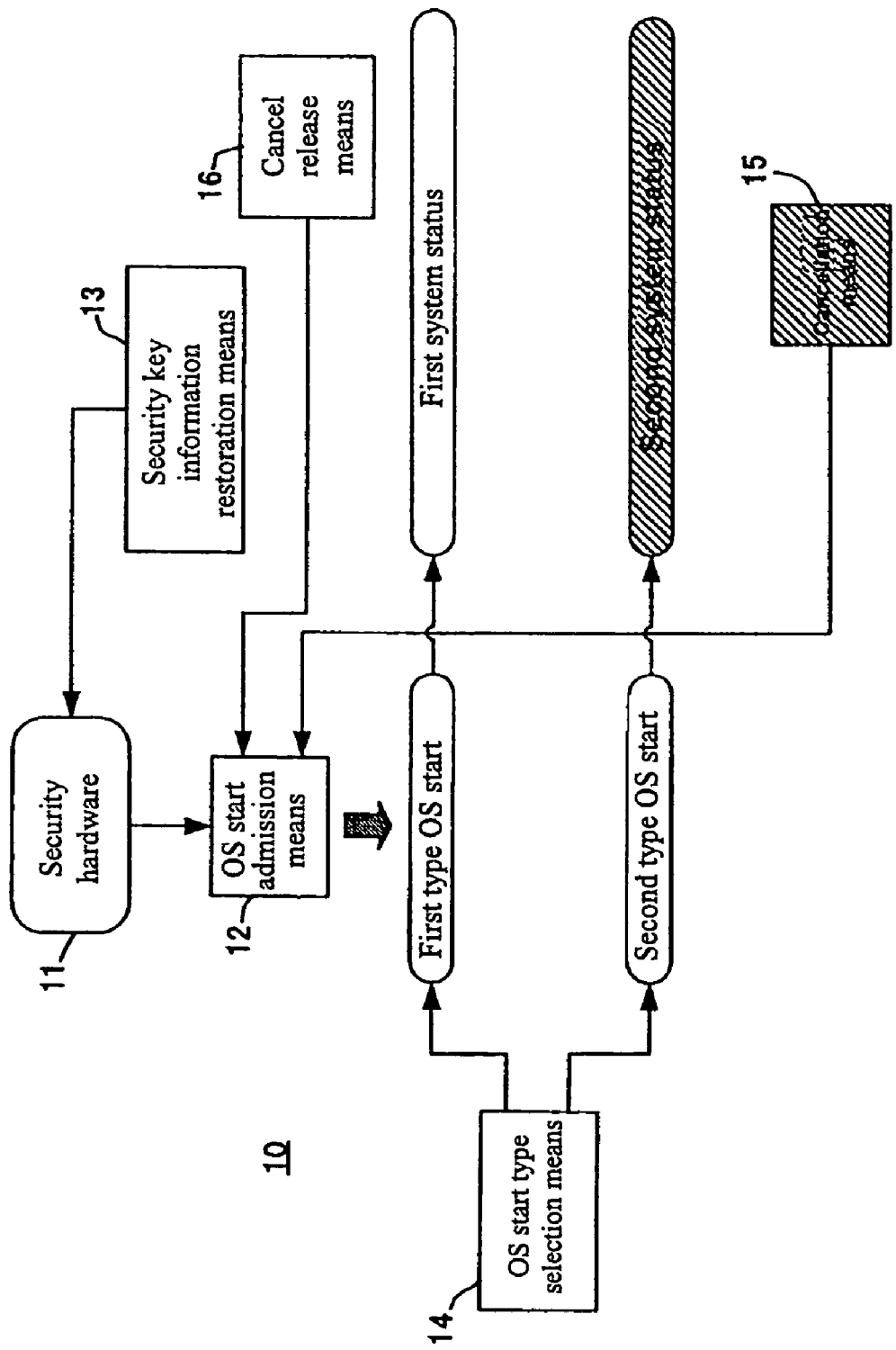

[Figure 2]
(a)
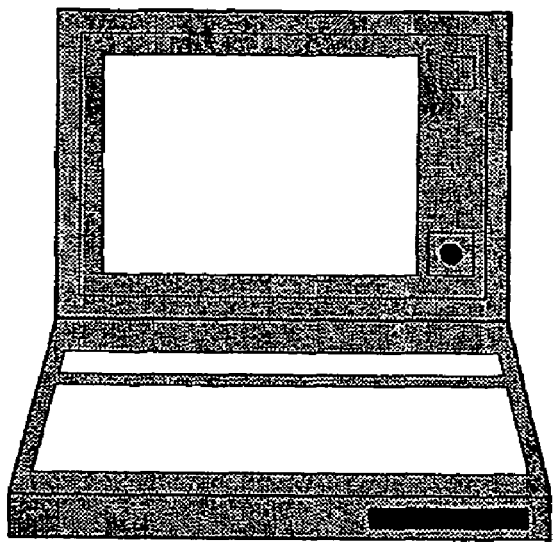
(b)
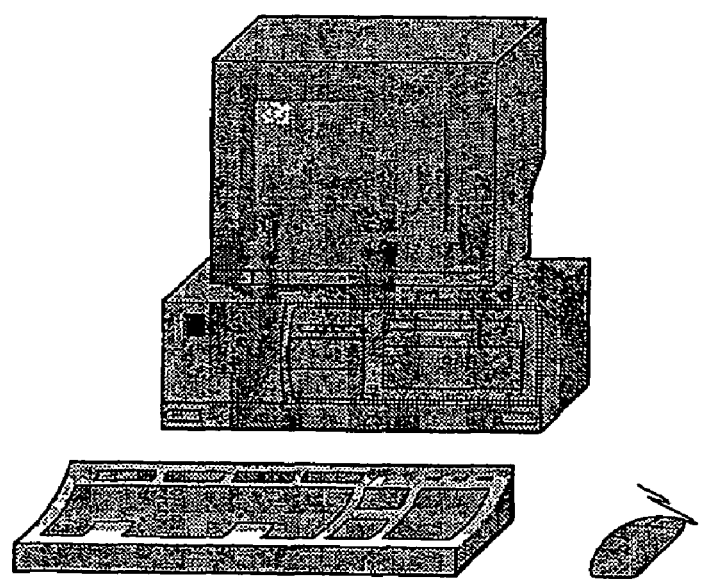

[Figure 3]
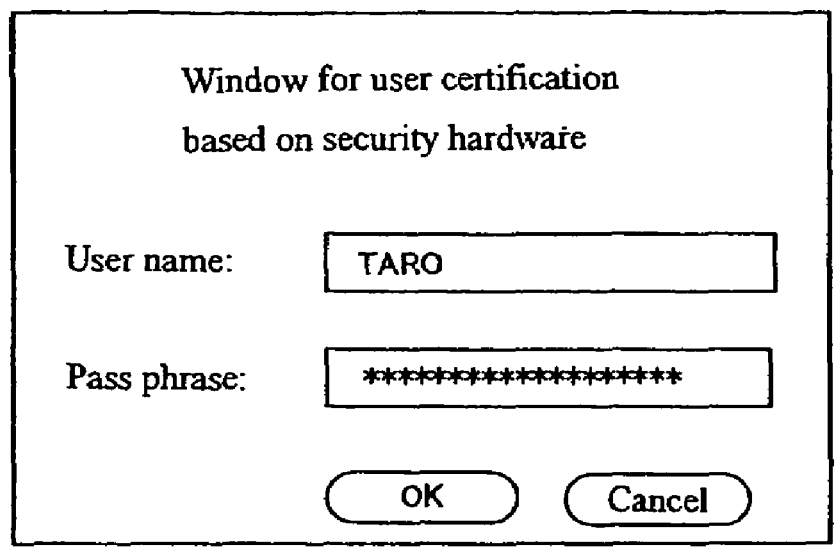
[Figure 4]
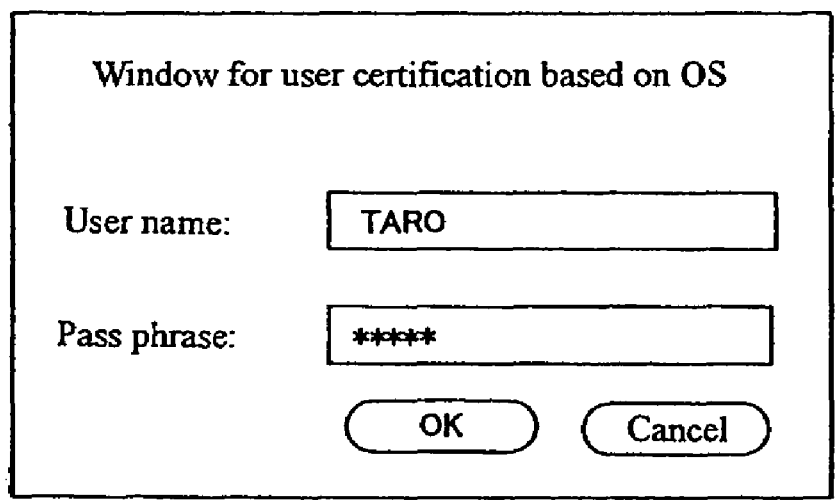

[Figure 5]
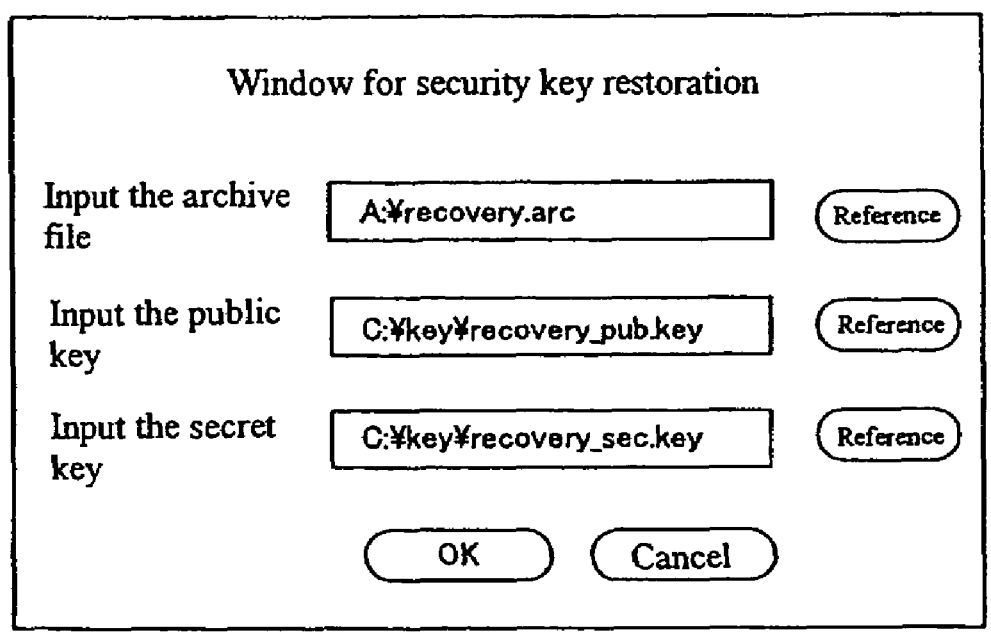

[Figure 6]
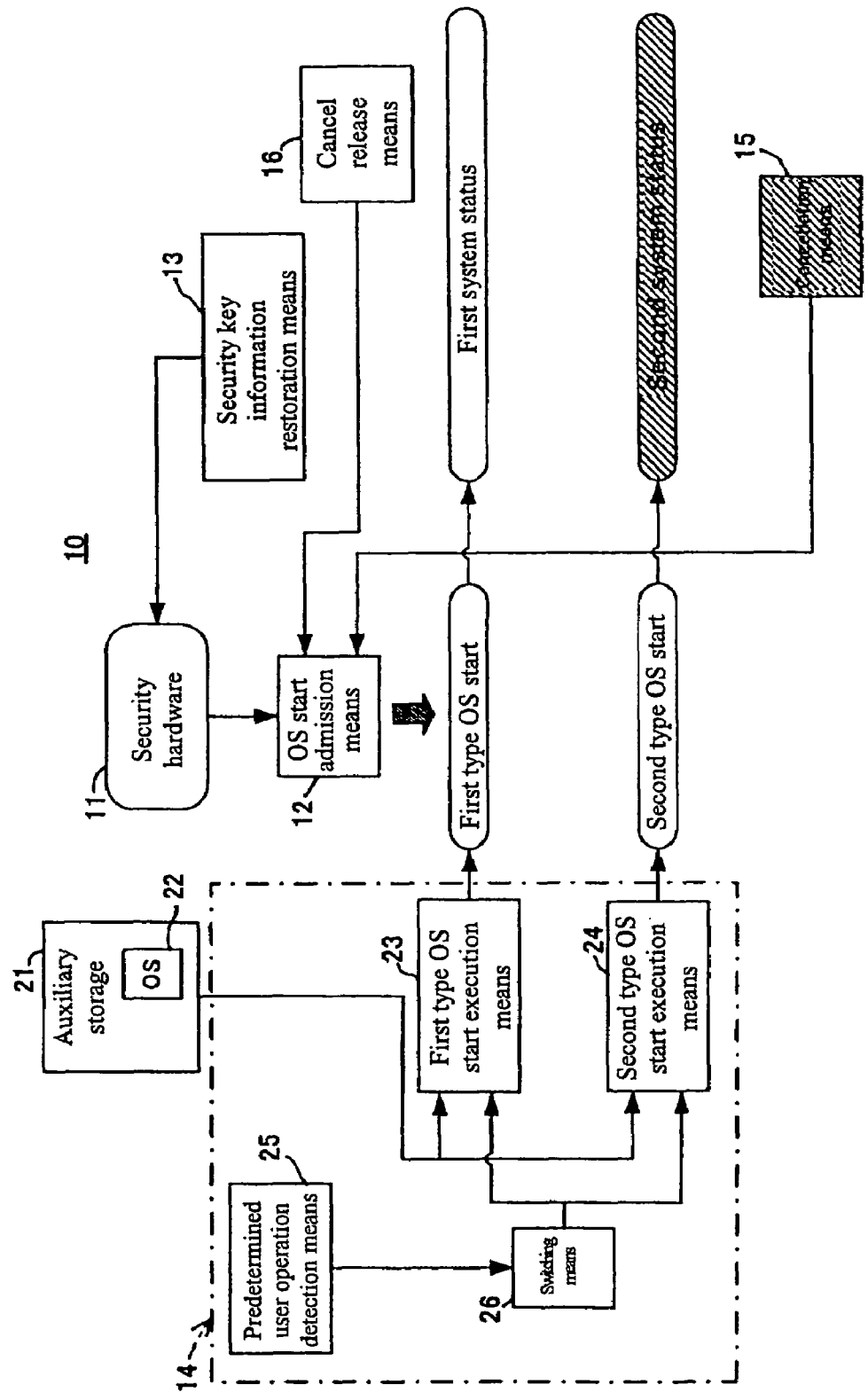

[Figure 7]
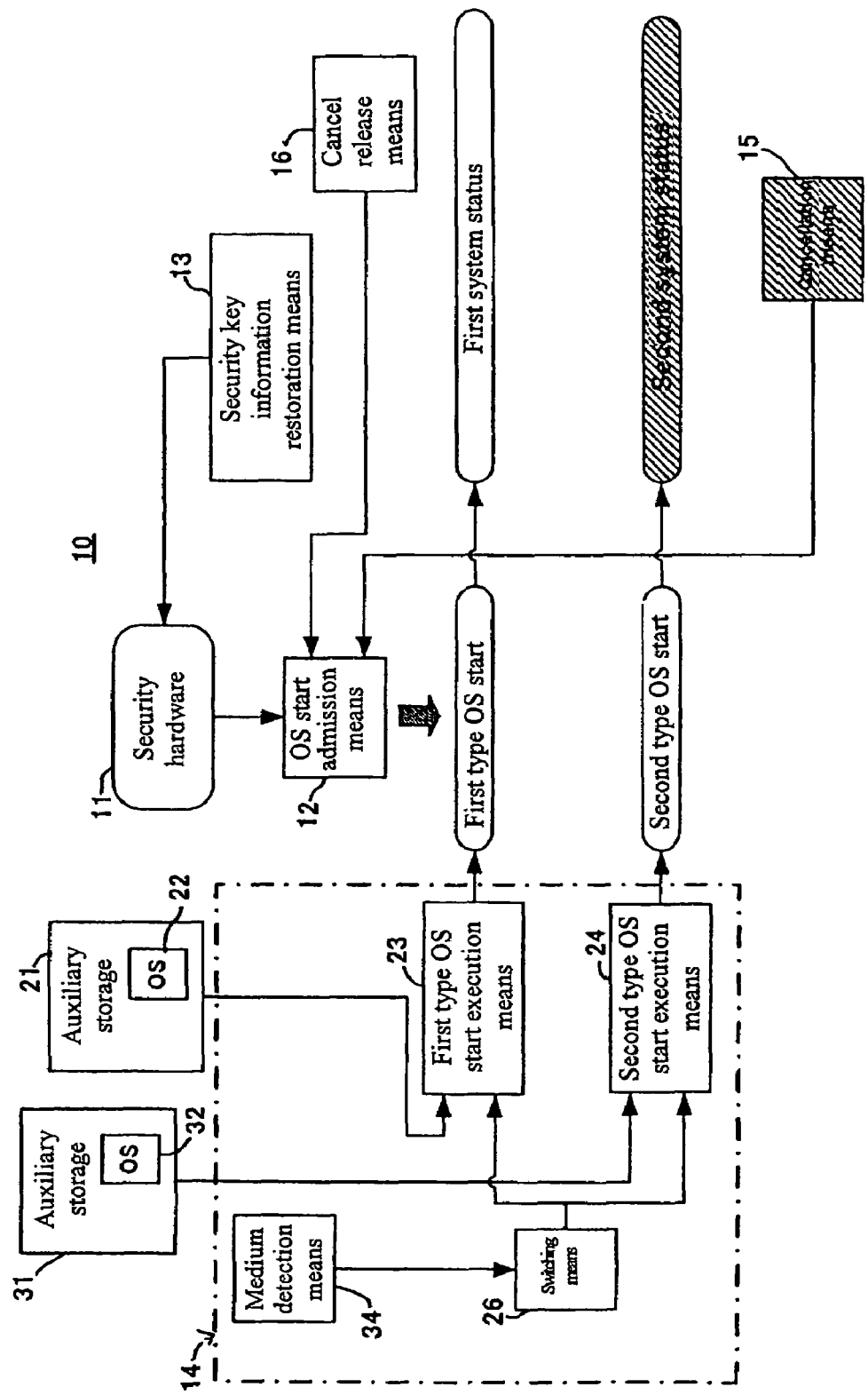

[Figure 8]
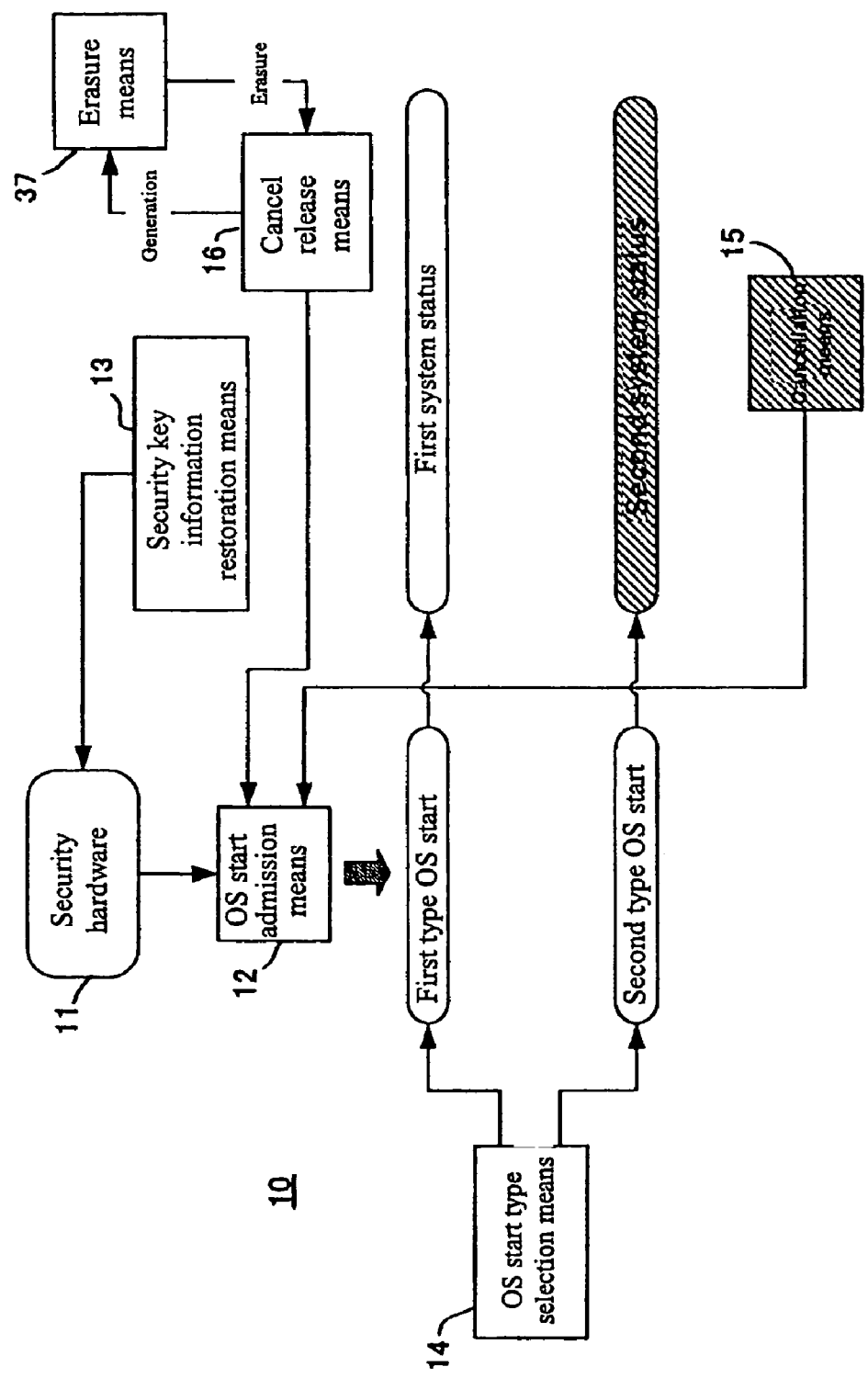

[Figure 9]
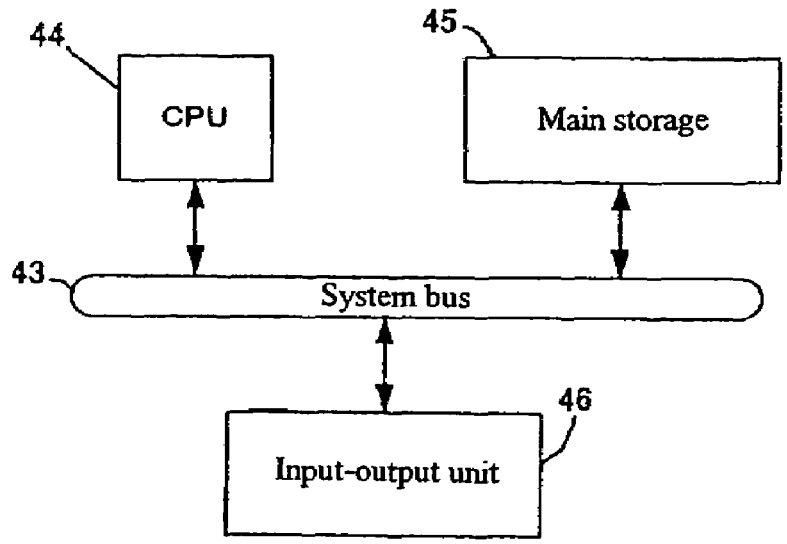
[Figure 10]
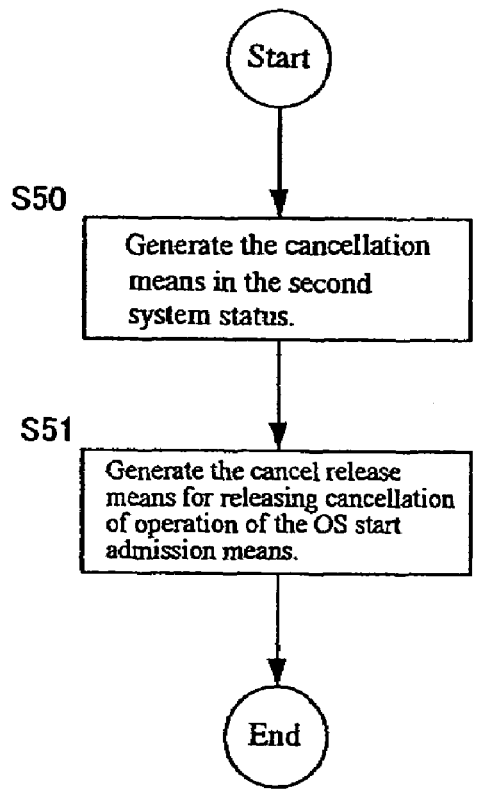

[Figure 11]
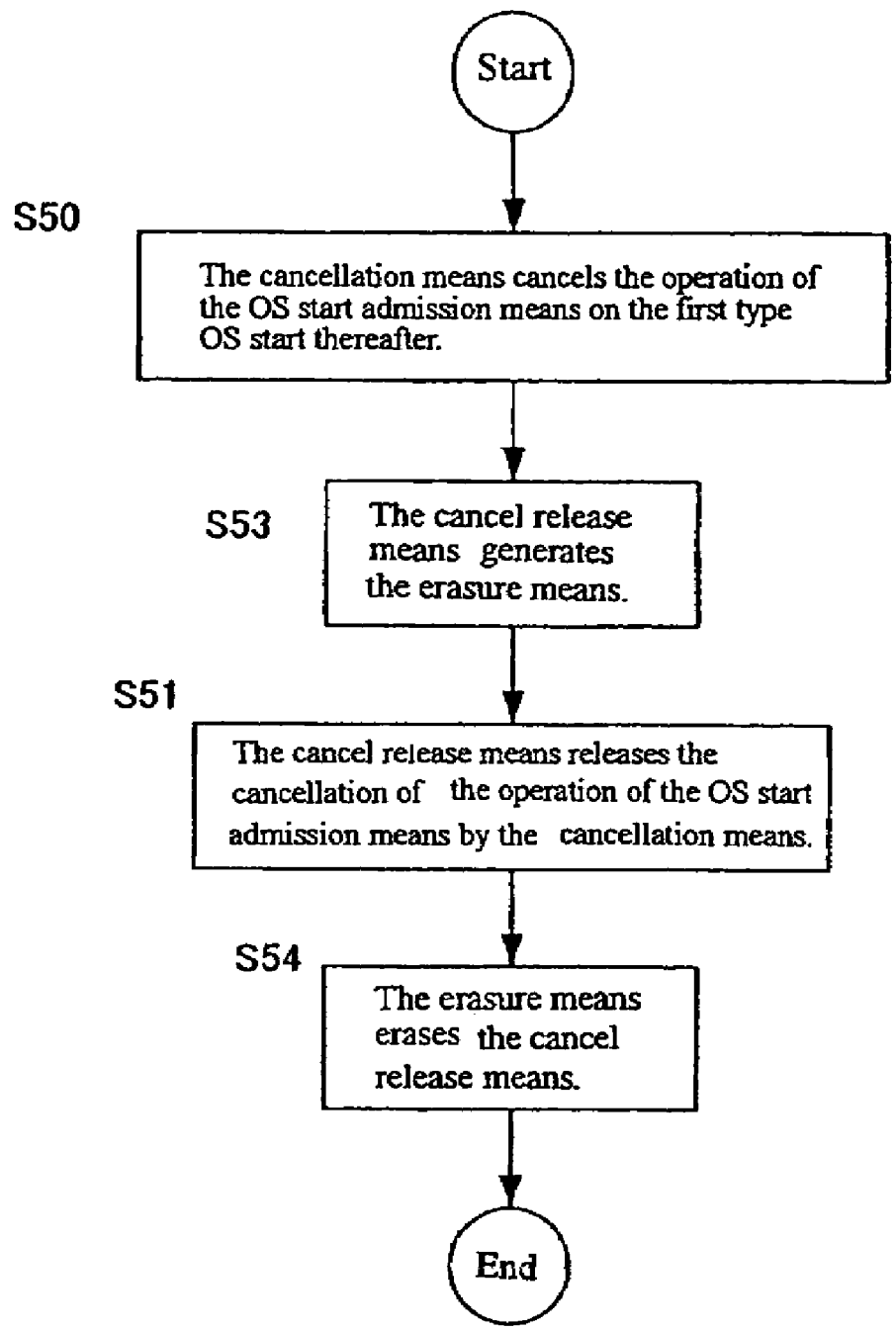

INFORMATION PROCESSING APPARATUS FOR SECURE INFORMATION RECOVERY

BACKGROUND OF THE INVENTION

The present invention relates to an information processing apparatus such as a personal computer, an information processing apparatus controlling method and an information processing apparatus controlling program, and in particular, to the information processing apparatus equipped with security hardware for performing user certification based on security key information in the security hardware on system log-on, and information processing apparatus controlling method and information processing apparatus controlling program thereof.

A PC (Personal Computer) equipped with a security chip compliant with the TCPA (Trusted Computing Platform Alliance: "http: //www.trustedcomputing.org/tcpaasp4/index.asp") standards uses a predetermined cryptographic program and security key information in the security chip and thereby executes various security processes such as user certification as to whether or not to permit a start of an OS (Operating System), encryption and decryption of a file and a folder in collaboration with the OS, storage of a digital certificate and integration of the user certification in various applications.

Published Unexamined Patent Application No. 2001-99466 teaches reading the security key information in the security hardware such as an IC card via a certification apparatus connected to a terminal and determining whether or not an owner of the security hardware is an authorized owner based on the security key information so as to allow a log-in from the terminal to a host only when determination results are "Yes".

As for a repair of a PC relating to an ordinary hardware failure, it is sufficient to replace the failed hardware with a new one. As opposed to this, in the case of making a repair including replacement of a security chip compliant with the TCPA, security key information stored in the security chip before the replacement does not exist in the new security chip after the replacement. Therefore, an OS start (hereafter, referred to as a "system log-on" as appropriate) cannot be implemented even if the power of the PC is turned on after replacing the security chip so that it becomes difficult to use the PC. To be more specific, the security key information in the security chip is encrypted by a predetermined program in the security chip and is stored therein. To perform user certification for the system log-on based on the security key information, it is necessary to decrypt the security key information in the security chip with a program in the security chip. If there is no security key information in the security chip, the decryption becomes difficult and so user certification cannot be executed so that the system log-on becomes difficult. In order to overcome it, it is necessary to reinstall the OS on the PC and then newly set up the security key information again, which takes enormous amounts of labor and time. In addition, as for the folders and files stored on the hard disk after being encrypted based on the security key information in the security chip before the replacement, it is difficult to decrypt them even if new security key information is registered separately as to the new security chip since they are encrypted based on the security key information in the security chip before the replacement. The security chip compliant with the TCPA is normally mounted on a mother board, and in the case of a typical repair, the entire mother board is replaced when an element of the mother board is faulty. Accordingly, there are many cases where the security chip is replaced even if the security chip itself is not faulty.

The above mentioned patent application shows a measure to deal with a situation in which, after being certified based on authorized security hardware and logging into a host from a terminal once, the authorized security hardware is maliciously replaced by unauthorized hardware and a session is continued. However, it does not disclose any effective measure to restore the security key information in the security hardware after the replacement in the case where, on the replacement of the security hardware, an authorized user cannot log on to the system and restore the security key information of the security hardware before the replacement to new security hardware without using the security key information of the security hardware before the replacement.

SUMMARY OF THE INVENTION

An object of the present invention is to provide an information processing apparatus, an information processing apparatus controlling method and an information processing apparatus controlling program wherein the security key information of the security hardware before the replacement is required to log on to the system, and for the sake of restoring the security key information of the security hardware before the replacement to the security hardware after the replacement, it is possible to restore the information to the new security hardware after the replacement on the information processing apparatus to which system log-on is necessary.

The information processing apparatus according to the present invention comprises:

a) Security hardware for storing security key information in a readable and writable state;

b) OS start admission means for, on an OS start, determining whether or not input data for user certification is authorized based on the above described security key information read from the above described security hardware and allowing the OS to start if the determination results are positive;

c) Security key information restoration means for restoring the security key information to the security hardware based on predetermined data for restoration;

d) OS start type selection means for selecting and executing either one of a first type of the OS start for generating a system status in which the above described security key information restoration means is operable (hereafter, referred to as a "first system status"), and operating the above described OS start admission means and a functionally restricted second type of the OS start for generating a functionally restricted system status in which the above described security key information restoration means is inoperable (hereafter, referred to as a "second system status") and not operating the above described OS start admission means; e) Cancellation means, generated in a period of the second system status, for canceling the operation of the above described OS start admission means in the First type OS start; and f) Cancel release means for, after the first type OS start in which the operation of the above described OS start admission means is canceled by the above described cancellation means is performed at least once, canceling the cancellation of the operation of the above described OS start admission means by the above described cancellation means.

According to the present invention, the second type OS start is used as a different form than the first type OS start.

The first type OS start is a standard OS start for instance, which is the OS start in the case of starting an information processing apparatus in a functionally unrestricted system status. As opposed to this, the second type OS start is the OS start on an emergency or emergency evacuation for instance, which is the OS start for securing the system status for operating the information processing apparatus with minimum functions. In the case of a PC (Personal Computer) equipped with Windows® NT, Windows® 2000 or Windows® XP (all are registered trademarks of Microsoft Corporation) for instance, the standard OS start is performed just by power-on of the PC by a user without requiring any other special user operation. As opposed to this, the OS start for a safe mode as the Second type OS start is executed on performing a predetermined user operation, that is, continuously pressing an F8 key on a keyboard after the power-on of the PC. As for the second type OS start, it is possible, because of restrictions of the functions, to put the information processing apparatus in the second system status by skipping the user certification based on the security key information of the security hardware. In a second system status period, it is difficult to restore the security key information of the security hardware due to the restrictions of the functions, but it is possible to have a setup such as cancellation of a certification process relating to the security key information of the security hardware in the first type OS start thereafter. It is because such a setup is a low-level function and the second system status allows the functions of a predetermined level or a lower level than that to be performed. In the safe mode, as an example of the second system status, it is possible to copy a program file from an FD (floppy disk) to a hard disk and set up a standard mode on the start from the next time onward. Thus, a predetermined program is executed in the second system status so that computer software including cancellation means is generated. On the first type OS start from the generation thereof onward, the cancellation means cancels the operation of the OS start admission means, and is thereby able to put the information processing apparatus in the first system status without undergoing the user certification by the OS start admission means. In the first system status thus realized, the security key information of the security hardware is restored. On the first type OS start from the next time onward, the cancel release means operates so as to enable the user certification process by the OS start admission means based on the security key information of the security hardware. Consequently, on the information processing apparatus having its security hardware replaced by a new one, the system log-on and other processes are performed based on the same security key information as that of the information processing apparatus equipped with the security hardware before the replacement.

The information processing apparatus according to the present invention includes the above-mentioned information processing apparatus to which one or a plurality of the following: (a1) to (a6) in arbitrary combination are added.

(a1) The input data for the user certification is the data inputted with keystrokes by the user on the first type OS start.

(a2) The above described data for restoration is generated by rendering the security key information as restorable data on generating the security key information in the security hardware, and is stored in an auxiliary storage.

(a3) The first and second type OS starts are the starts based on the same OS stored in the same auxiliary storage, and on starting the OS, the above described OS start type selection means detects whether or not there is the predetermined user operation so as to select and execute the first type OS start in the case of "No" and the second type OS start in the case of "Yes" respectively.

(a4) The first and second type OS starts are the starts based on the OSes stored in different auxiliary storages respectively, and when the second OS is readable from the auxiliary storage storing it, the above described OS start type selection means selects and executes the second type OS start in preference to the first type OS start.

(a5) It further has erasure means for erasing the above described cancel release means after the above described cancel release means releases the cancellation of the operation of the above described OS start admission means by the above described cancellation means.

(a6) In the above (a5), the above described erasure means is generated by the above described cancel release means.

The information processing apparatus to which the information processing apparatus controlling method according to the present invention is applied comprises: security hardware for storing security key information so that it can be freely read and written; OS start admission means for determining whether or not the input data for the user certification is valid when the OS starts based on the above described security key information read from the above described security hardware and admitting the OS to start if the determination result is "Yes"; security key information restoration means for restoring the security key information in the security hardware based on predetermined data for restoration; and the OS start type selection means for selecting and executing either the first type OS start for generating the system status in which the above described security key information restoration means is operable (hereafter, referred to as the "first system status") and operating the above described OS start admission means or the functionally restricted second type OS start for generating the functionally restricted system status in which the above described security key information restoration means is inoperable (hereafter, referred to as the "second system status") and not operating the above described OS start admission means. And the information processing apparatus controlling method according to the present invention comprises the following steps:

a) A cancellation means generation step of generating the above described cancellation means during the above described second system status period so that the cancellation means cancels the operation of the above described OS start admission means as to the first type OS start after it is generated; and b) A cancel release means generation step of generating the above described cancel release means so that it releases the cancellation of the operation of the above described OS start admission means by the above described cancellation means after the first type OS start having the operation of the above described OS start admission means canceled by the above described cancellation means is executed at least once.

The information processing apparatus controlling method according to the present invention includes the above-mentioned information processing apparatus controlling method to which one or a plurality of the following (b1) to (b6) in arbitrary combination may be added:

(b1) The input data for the user certification is the data inputted with keystrokes by the user on the first type OS start.

(b2) The above described data for restoration is generated by rendering the security key information as the restorable data on generating the security key information in the security hardware, and is stored in an auxiliary storage.

(b3) The first and second type OS starts are the starts based on the same OS stored in the same auxiliary storage, and on starting the OS, the above described OS start type selection means detects whether or not there is the predetermined user operation so as to select and execute the first type OS start in the case of "No" and the second type OS start in the case of "Yes" respectively.

(b4) The first and second type OS starts are the starts based on the OSes stored in different auxiliary storages respectively, and when the second OS is readable from the auxiliary storage storing it, the above described OS start type selection means selects and executes the second type OS start in preference to the first type OS start.

(b5) It further has an erasure step of having the above described cancel release means erased by the erasure means after the above described cancel release means releases the cancellation of the operation of the above described OS start admission means by the above described cancellation means.

(b6) In addition to the step of the above (b5), it has a step of having the above described erasure means generated by the above described cancel release means.

The information processing apparatus controlling program according to the present invention causes a computer to execute each step of the information processing apparatus controlling method according to the present invention.

BRIEF DESCRIPTION OF THE DRAWINGS

FIG. 1 is a block diagram of an information processing apparatus;

FIG. 2 is a drawing showing a portable PC and a desktop PC;

FIG. 3 is a drawing illustrating a window for user certification based on security key information of security hardware;

FIG. 4 is a drawing illustrating a window for the user certification based on an OS;

FIG. 5 is a drawing illustrating a work window for restoring the security key information of the security hardware;

FIG. 6 is a block diagram of the information processing apparatus equipped with the OS start type selection means in a predetermined form;

FIG. 7 is a block diagram of the information processing apparatus equipped with the OS start type selection means in another predetermined form;

FIG. 8 is a block diagram of the information processing apparatus to which erasure means is added;

FIG. 9 is a hardware block diagram for executing the program relating to the flowchart in FIG. 10;

FIG. 10 is a flowchart of a controlling method of the information processing apparatus; and FIG. 11 is a flowchart wherein predetermined steps are further added to FIG. 10.

DETAILED DESCRIPTION OF A PREFERRED EMBODIMENT

Hereafter, an embodiment of the present invention will be concretely described. It is needless to mention that the present invention is not limited to the embodiment and working example but is variously modifiable as far as it does not deviate from the gist thereof. Configurations in all the drawings will be described first, and then operation of an information processing apparatus 10 will be described according to a procedure of restoring security key information performed by a repairer of the information processing apparatus 10.

FIG. 1 is a block diagram of the information processing apparatus 10. In FIG. 1, a block of cancellation means 15 is shaded, which means that the cancellation means 15 is generated in a second system status. Cancel release means 16 may also be generated in the second system status as with the cancellation means 15 instead of a first system status if it is set to release cancellation of operation of OS start admission means 12 by the cancellation means 15 after the cancellation. The cancel release means 16 is generated, for instance, in the first system status by means of a first type OS start wherein the operation of the OS start admission means 12 is canceled by the cancellation means 15. Security hardware 11 stores security key information so that it can be freely read and written. The OS start admission means 12 determines whether or not input data for user certification is valid when an OS starts based on the security key information read from the security hardware 11 and admits the OS to start if the determination result is "Yes." Security key information restoration means 13 restores the security key information in the security hardware 11 based on predetermined data for restoration. OS start type selection means 14 selects and executes either a first type OS start for generating a system status in which the security key information restoration means 13 is operable (hereafter, referred to as a "first system status") and operating the OS start admission means 12 or a functionally restricted second type OS start for generating a functionally restricted system status in which the security key information restoration means 13 is inoperable (hereafter, referred to as a "second system status") and not operating the OS start admission means 12. The cancellation means 15 is generated during a period of the second system status and cancels the operation of the OS start admission means 12 as to the first type OS start. To comment on it, the cancellation means 15 implements a process of canceling the operation of the OS start admission means 12 as to the first type OS start. As a matter of course, this process comes after it is generated, and so it is difficult to implement the process before the generation. The cancellation of the operation of the OS start admission means 12 by the cancellation means 15 is released after the first type OS start having the operation of the OS start admission means 12 canceled by the cancellation means 15 is executed at least once.

Typically, as soon as the first type OS start having the operation of the OS start admission means 12 canceled by the cancellation means 15 is executed once, the cancellation of the operation of the OS start admission means 12 by the cancellation means 15 is released. However, the time for releasing the cancellation may also be after the first type OS start is executed a predetermined plurality of times, on the first type OS start for the first time after predetermined time elapsed from the time of the first execution or in the first system status period.

FIG. 2 shows a portable PC (Personal Computer) 18 and a desktop PC 19. The information processing apparatus 10 is a portable PC 38 or a desktop PC 39 for instance, and may further be another PC, a PDA (Personal Digital Assistant), a portable telephone, a household electric appliance or a game console.

The security hardware is not limited to a security chip on a mother board, but may also be other security hardware such as an IC card or a portable memory device to be directly inserted, via no cable, into a connector for connecting a peripheral such as a USB (Universal Serial Bus) of the PC. The security chip is typically an EEPROM (Electrically Erasable Programmable Read-Only Memory). In the case where the information processing apparatus is the PC, the OS may be another OS such as Linux, Mac OS (trademark) or the OS for TRON, for instance, other than Windows® NT, Windows® 2000, Windows® XP or DOS (all are registered trademarks). In the case where the OS is, Windows® the first and second system statuses correspond to the standard mode and safe mode respectively.

The input data for the user certification is the data inputted with keystrokes by the user on the first type OS start, for instance. FIG. 3 illustrates a window for the user certification based on the security key information of the security hardware. The PC as the information processing apparatus 10 has the window in FIG. 3 displayed on a display of the PC on the first type OS start. The user inputs a user name and a pass phrase (ex.: It is fine today) relating to himself or herself in the user name field and pass phrase field in the window in FIG. 3 by using a keyboard. Next, if the "OK" button is clicked on, the user name and pass phrase are taken into a CPU, and are checked against the data relating to the security key information in the security hardware 11. And if it is certified that the user is authorized, the first type OS start is executed. The input data for the user certification on the OS start is not limited to the password and pass phrase inputted via the keyboard by the user, but may also be the data relating to a fingerprint and iris of the user detected from the user.

FIG. 4 illustrates the window for the user certification based on the OS. As for the user certification based on the OS on the system log-on, the user certification based on the security key information in the security hardware 11 relating to FIG. 3 is different from the user certification based on the OS on the system log-on relating to FIG. 4. The user inputs the user name and password in each field of the window for the user certification in FIG. 4. The software using the security chip as the security hardware 11 on the PC for the security of the PC (hereafter, the software is referred to as "CSS (Client Security Software)" is to be downloaded as appropriate to the PC from a predetermined site on the Internet by the user who purchased the PC equipped with the security chip. And the CSS can integrate the certifications by the OS and applications into the certifications based on the security key information of the security chip on the system log-on. To be more specific, the CSS allows the user of the PC, by a setup, to undergo the certification based on the security key information of the security chip just once on the system log-on without necessity to repeatedly undergo any other user certification during the system log-on.

The data for restoration is generated by rendering the security key information as restorable data, for instance, on generating the security key information in the security hardware 11, and is stored in an auxiliary storage such as a hard disk. FIG. 5 illustrates a work window for restoring the security key information of the security hardware 11. The CSS has functions of newly registering the security key information with the security chip, deleting the security key information registered with the security chip and restoring the security key information in addition to the user certification such as permission of the system log-on, encryption and decryption of files and folders in collaboration with the OS, storage of a digital certificate and integration of the user certification in various applications. When creating the security key information, the CSS has a file for implementing restoration intended to implement the restoration of the security key information generated as a pair with the security key information. Such a file for implementing the restoration should preferably be stored as an archive file on an FD, and the user of the information processing apparatus 10 should store the FD in an appropriate place. However, an archive file for implementing the restoration may be stored on the hard disk. When storing the archive file for implementing the restoration on a predetermined FD, the repairer of the information processing apparatus 10 receives the FD from the user, has it sent by e-mail from the user or has it stored in advance in a predetermined folder on the hard disk. The repairer inputs the archive file for implementing the restoration, a public key file and a secret key file in each input field together with a pass in the window for restoring the security key information in FIG. 5. This input can be implemented by the user, instead of directly writing it, by clicking on a "reference" button to access the predetermined folder in a predetermined drive and select the applicable file. If the applicable files are completely inputted into the three input fields, the repairer clicks on the "OK" button. Thus, if it is verified by the archive file for implementing the restoration that the three files inputted into the three input fields are provided for, then the security key information is restored to the security chip. While the CSS can obtain the pass phrase from the three elements of the archive file as the file for implementing the restoration, public key and security key, it is difficult to obtain the pass phrase only from the archive file. Therefore, even if the FD storing the archive file is stolen, the appropriator cannot obtain the pass phrase.

FIG. 6 is a block diagram of the information processing apparatus 10 equipped with the OS start type selection means 14 in a predetermined form. The first and second type OS starts are the starts based on the same OS 22 stored in the same auxiliary storage 21 (typically a hard disk). The OS start type selection means 14 in FIG. 6 has first and second type OS start execution means 23 and 24, predetermined user operation detection means 25 and switching means 26. On starting the OS 22, the predetermined user operation detection means 25 detects whether or not a predetermined user operation is performed. In the case of "No" as to the predetermined user operation, the switching means 26 operates the first type OS start execution means 23, and operates the second type OS start execution means 24 in the case of "Yes."

FIG. 7 is a block diagram of the information processing apparatus 10 equipped with the OS start type selection means 14 in another predetermined form. The first and second type OS starts are the starts based on different OSes 22 and 32 stored in different auxiliary storages 21 and 31 respectively. The auxiliary storages 21 and 31 are the hard disk and FD (floppy disk) respectively, for instance. Typically, the auxiliary storages 21 is a permanent auxiliary storage, and the auxiliary storage 31 is a replaceable medium. The OS start type selection means 14 in FIG. 7 has the first and second type OS start execution means 23 and 24, medium detection means 34 and switching means 26. The medium detection means 34 detects whether or not the OS 32 is readable from the auxiliary storage 31 storing the OS 32. If the replaceable medium having the OS exists in a medium drive thereof, the information processing apparatus 10 adopts a method of reading the OS from the replaceable medium in preference to a permanent medium having the OS. Thus, when the second OS 32 is readable from the auxiliary storage 31 storing the second type OS start 32, the switching means 26 operates the second type OS start execution means 24, and operates the first type OS start execution means 23 when it is impossible.

FIG. 8 is a block diagram of the information processing apparatus 10 to which erasure means 37 is added. After the cancel release means 16 releases the cancellation of the operation of the OS start admission means 12 by the cancellation means 15, the erasure means 37 erases the cancel release means 16. The erasure means 37 is generated by the above described cancel release means 16, for instance. Although the cancellation means 15 and cancel release means 16 are implemented as software functions, it is desirable in terms of management to limit owners of the software to specific persons such as the repairers. In this case, after performing work, the repairer needs to start the software from the replaceable medium separable from the information processing apparatus 10 such as the FD so that the cancellation means 15 and cancel release means 16 as main portions of the software do not remain thereafter on the hard disk permanently provided to the information processing apparatus 10. It is possible to perform the function of the cancellation means 15, that is, the setup for canceling the operation of the OS start admission means 12 on the first type OS start from the next time onward, from the replaceable medium in the second system status so as to avoid storing the software in the hard disk. As for the software portion constituting the cancel release means 16, however, it cannot be executed in the second system status so that there are the cases where it needs to be copied on the hard disk to be executed. Nevertheless, it is feasible to have the cancel release means 16 erased by the erasure means 37 such as a program/file deletion program in a period immediately after the cancel release means 16 executes its function, that is, in the next first system status period for instance so as to prevent the information processing apparatus 10 from being returned from the repairer to the user with the software portion constituting the cancel release means 16 remaining on the hard disk.

The operation of the information processing apparatus 10 will be described while giving a description of the procedure (R1) to (R6) for having the security key information restored on the security hardware 11 by the repairer when repairing the information processing apparatus 10 by replacing the security hardware 11. In the case where the OS is the Windows®, the first and second type OS starts correspond to the OS starts in the standard mode and safe mode respectively, for instance. The OS start in the standard mode is executed just by having the power of the PC turned "on" by the user (including the repairer). As opposed to this, the OS start in the safe mode requires other operation such as pushing a function switch F8 in addition to turning the power of the PC "on." Therefore, it is possible, by detecting whether or not the predetermined user operation is performed, to determine whether to start the OS in the standard mode or in the safe mode. The system status in the safe mode has limited functions compared to the system status in the standard mode. As for the OS start and the system status in the safe mode, only the minimum functions are allowed in order to secure the operation of the PC in spite of predetermined trouble. Therefore, the second type OS start skips, that is, does not execute the process of determining whether or not the input data for the user certification is valid when the OS starts based on the security key information read from the security hardware 11 (hereafter, referred to as the "user certification based on the security key information"). And in the second system status as the system status based on the second type OS start, either an advanced type application becomes inexecutable or an ordinary application having only low-level functions becomes difficult to execute. Moreover, it is possible, in the state of the safe mode, to copy the file in the FD (floppy disk) to the hard disk and also execute a program having only lower-level functions than a predetermined level.

(R1) The second system status is executed on the information processing apparatus 10 so as to execute the second type OS start thereon. The OS start type selection means 14 in FIG. 6 determines whether to execute the first type OS start or the second type OS start based on detection by the predetermined user operation detection means 25 as to whether or not the predetermined user operation is performed. For instance, in the case where the OS is the Windows®, the OS start type selection means 14 executes a safe mode start as the second type OS start if there is the user operation of keeping on pressing the F8 key on the keyboard after turning "on" the power switch of the information processing apparatus 10, and executes a standard mode start as the first type OS start if there is no such user operation. The OS start type selection means 14 in FIG. 7 determines whether to execute the first system status or the second system status based on whether or not the auxiliary storage 31 storing the OS 32 exists in the drive therefor (the drive may be either internal or external if it is connected to the system). In the case where there is the medium such as the FD or CD-ROM capable of reading the OS in the FD drive or CD-ROM drive, a general PC reads the OS from the replaceable medium in preference to the OS in the hard disk and starts it. In the case of the OS start for the safe mode or the start of the OS 32 on the auxiliary storage 31, the functions are sufficiently limited to start the minimum functions. Therefore, the user certification based on the security key information on the OS start is omitted without displaying the window in FIG. 3, and the OS start progresses so that the information processing apparatus 10 is put in the second system status.

(R2) After the second type OS start is executed on the information processing apparatus, the repairer sets the FD storing a predetermined program (the program is called "CSSRT (Client Security Software Repair Tool)" for convenience sake) on an FD drive, and executes the program CSSRT. The FD drive may be either built into the PC or connected separably to the PC proper via a USB (Universal Serial Bus) cable. The program CSSRT includes a CSSRT proper for performing the function of the cancellation means 15 and a portion CSSRT_1 for performing the function of the cancel release means 16, and copies the portion CSSRT_1 from the FD to the hard disk as the auxiliary storage or creates it on its own to store it on the hard disk.

(R3) As the program CSSRT comes to an end, the information processing apparatus 10 restarts automatically or according to an instruction of the repairer. It is noteworthy that, on the restart, the program CSSRT_1 remains on the hard disk but the CSSRT proper does not remain anywhere on the information processing apparatus 10.

(R4) On the start, the repairer omits the predetermined user operation such as keeping on pressing the F8 key on the keyboard, for instance. The OS start type selection means 14 detects whether or not the predetermined user operation is performed, and the switching means 26 operates the first type OS start execution means 23 to execute the first type OS start. As the OS start admission means 12 has its operation canceled by the cancellation means 15 on the first type OS start this time, it does not demand the repairer to input the pass phrase in FIG. 3 for admitting the OS start, that is, the data for the certification as the certification based on the security key information in the security chip. Thus, the information processing apparatus 10 is put in the first system status. Moreover, the CSSRT_1 for performing the function of the cancel release means 16 performs that function, and while being alive, it also creates a deletion program CSSRT_1_DEL (a program equivalent to the erasure means 37 in FIG. 8) for deleting the CSSRT_1 as itself after finishing that function. Thus, the period in which the cancellation means 15 and cancel release means 16 exist in the permanent auxiliary storage such as the hard disk is extremely limited. Typically, the CSSRT_1 also performs the function of calling the CSS after performing the function of the cancel release means 16.

(R5) In the first system status after (R4), the repairer restores the security key information to the security hardware 11. The security key information restoration means 13 writes the security key information restored based on predetermined data for restoration to the security hardware 11. As previously described by referring to FIG. 5, the CSS can restore the security key information based on a data file for the restoration in the hard disk. The security key information restoration means 13 restores the security key information to the security hardware 11 based on the data for restoration inputted via the window for restoring the security key information in FIG. 5.

(R6) As the security key information of the security hardware 11 is restored by the security key information restoration means 13, the information processing apparatus 10 restarts automatically or on a predetermined instruction of the repairer. The CSSRT_1_DEL operates on this restart or in the first system status period after executing the CSSRT_1 and before the restart so as to delete the CSSRT_1. Therefore, on this restart, the cancellation means 15 does not operate in spite of the first type OS start, and the user certification based on the security key information is executed.

There is no adverse effect in particular even if the program for implementing the function of the erasure means 37 remains on the hard disk. In case the information processing apparatus 10 is returned from the repairer to the user with the program relating to the cancel release means 16 remaining in the permanent auxiliary storage, it means that the user is requested to undergo his or her own user certification, where the only disadvantage is that an extra program not to be used remains on the hard disk.

FIG. 9 is a hardware block diagram for executing the program relating to the flowchart in FIG. 10. The steps of the method relating to the flowchart in FIG. 10 are performed by using the hardware in FIG. 9, for instance. A system bus 43 has a CPU 44, a main storage 45 and an input-output unit 46 connected thereto. The method relating to the flowchart in FIG. 10 mentioned later is executable as a coded program. The input-output unit 46 includes the auxiliary storage such as the hard disk storing the program, and the program is stored in the main storage 45 before it is executed by the CPU 44. The CPU 44 sequentially reads rows of codes of the main storage 45 and executes the program.

FIG. 10 is a flowchart of a controlling method of the information processing apparatus 10. As described in FIG. 1, the information processing apparatus 10 to which the controlling method is applied has the security hardware 11, OS start admission means 12, security key information restoration means 13 and OS start type selection means 14. The security hardware 11 stores the security key information so that it can be freely read and written. The OS start admission means 12 determines whether or not the input data for the user certification is valid when the OS starts based on the security key information read from the security hardware 11 and admits the OS to start if the determination result is "Yes." The security key information restoration means 13 restores the security key information in the security hardware 11 based on the predetermined data for restoration.

The OS start type selection means 14 selects and executes either the first type OS start for generating the system status in which the security key information restoration means 13 is operable (hereafter, referred to as the "first system status") and operating the OS start admission means 12 or the functionally restricted second type OS start for generating the functionally restricted system status in which the security key information restoration means 13 is inoperable (hereafter, referred to as the "second system status") and not operating the OS start admission step. In the flowchart in FIG. 10, the cancellation means 15 cancels the operation of the OS start admission means 12 as to the first type OS start after it is generated in S50. In S51, the cancel release means 16 releases the cancellation of the operation of the OS start admission means 12 by the cancellation means 15 after the first type OS start having the operation of the OS start admission means 12 canceled by the cancellation means is executed at least once.

Thus, when restoring the security key information on the replacement of the security hardware 11, the repairer puts the information processing apparatus 10 in the second system status by the second type OS start capable of skipping the user certification by the OS start admission means 12 based on the security key information of the security hardware 11. Thereafter, the cancellation means 15 is generated by executing the program. On the next first type OS start, the cancellation means 15 cancels the certification by the OS start admission means 12 based on the security key information of the security hardware 11, and puts the information processing apparatus 10 in the first system status in spite of no existence of the security key information on the security hardware 11. In the first system status period, the security key information of the security hardware 11 is restorable, and the security key information restoration means 13 restores the security key information. The cancel release means 16 releases the cancellation of the operation of the OS start admission means 12 by the cancellation means 15. Thus, the user certification by the OS start admission means 12 based on the security key information of the security hardware 11 is executed again from the next first type OS start.

The information processing apparatus 10 to which the controlling method relating to the flowchart in FIG. 10 is applied includes the one to which one or a plurality of the following forms (c1) to (c6) in arbitrary combination are added.

(c1) The input data for the user certification is the data inputted with keystrokes by the user on the first type OS start.

(c2) The data for restoration is generated by rendering the security key information as the restorable data on generating the security key information in the security hardware 11, and is stored in an auxiliary storage 21.

(c3) The first and second type OS starts are the starts based on the same OS 22 stored in the same auxiliary storage 21, and on starting the OS, the OS start type selection means 14 detects whether or not there is the predetermined user operation so as to select and execute the first type OS start in the case of "No" and the second type OS start in the case of "Yes" respectively.

(c4) The first and second type OS starts are the starts based on the OSes stored in different auxiliary storages 21 and 31 respectively, and when the second OS 32 is readable from the auxiliary storage 31 storing it, the OS start type selection means 14 selects and executes the second type OS start in preference to the first type OS start.

(c5) It has an erasure step of having the cancel release means 16 erased by the erasure means 37 after the cancel release means 16 releases the cancellation of the operation of the OS start admission means 12 by the cancellation means 15.

(c6) In addition to the step of the above (c5), it has a step of having the erasure means 37 generated by the cancel release means 16.

FIG. 11 is a flowchart wherein the steps corresponding to the above (c5) and (c6) are added to the flowchart in FIG. 10. S53 may also be placed between S51 and S54. In S53, the cancel release means 16 generates the erasure means 37. In S54, the erasure means 37 erases the cancel release means 16.

According to the present invention, it is possible, in the information processing apparatus for performing the user certification when the OS starts based on the security key information of the security hardware, to restore the security key information of the old security hardware to the new security hardware on replacing the security hardware for the sake of troubleshooting and so on.

What is claimed is:

1. An information processing apparatus comprising:
   security hardware for storing security key information;
   OS start admission circuit for, in response to an operating system attempting to start, determining whether or not an input data for user certification is valid based on said security key information read from said security hardware, and permitting said operating system to start when said determination result is positive;
   security key information restoration circuit for restoring security key information in said security hardware based on predetermined data for restoration, wherein said predetermined data for restoration is generated when generating said security key information within said security hardware in order to render said security key information freely restorable and is stored in an auxiliary storage;
   OS start type selection circuit for selectively executing either a first type OS start to generate a first system status in which said security key information restoration circuit can operate said OS start admission circuit, or a second type OS start to generate a second system status in which said security key information restoration circuit cannot operate said OS start admission circuit;
   cancellation circuit, generated during said second system status, for canceling the operation of said OS start admission circuit as to said first type OS start; and
   cancel release circuit for releasing cancellation of the operation of said OS start admission circuit by said cancellation circuit after said first type OS start having the operation of said OS start admission circuit canceled by said cancellation circuit has been executed at least once.

2. The information processing apparatus of claim 1, wherein said input data for user certification is data keyed in by an user on said first type OS start.

3. The information processing apparatus of claim 1, wherein said first and second type OS starts are the starts based on same OS stored in the same auxiliary storage, and when starting said operating system, said OS start type selection circuit detects whether or not a predetermined user operation is performed so as to select and execute said first type OS start or said second type OS start.

4. The information processing apparatus of claim 1, wherein said first and second type OS starts are starts based on two operating systems, each being stored in a different auxiliary storage, and when a second operating system is readable from said auxiliary storage storing said second operating system, said OS start type selection circuit selects and executes said second type OS start in preference over said first type OS start.

5. The information processing apparatus of claim 1, wherein said information processing apparatus further includes erasure release circuit for erasing said cancel release circuit after said cancel release circuit releases the cancellation of the operation of said OS start admission circuit means by said cancellation circuit.

6. The information processing apparatus of claim 5, wherein said erasure circuit is generated by said cancel release circuit.

* * * * *